A. W. GRAY.
Churn.
No. 64,971. Patented May 21, 1867.
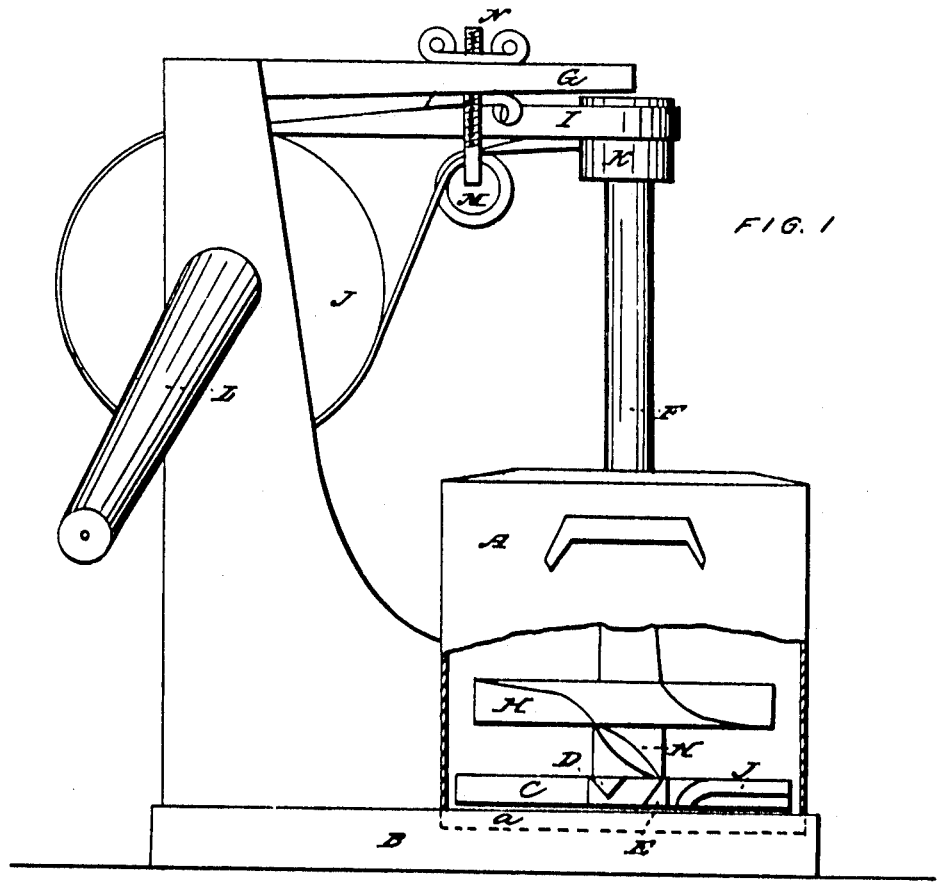
FIG. 1
FIG. 2
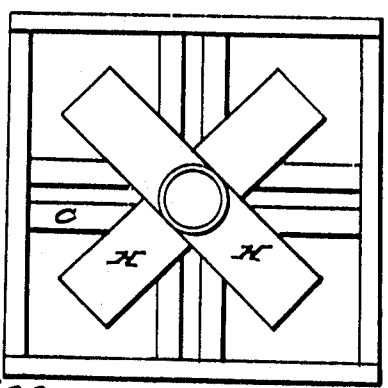
WITNESSES:
Frank Alden.
W. H. Burridge
INVENTOR:
Adelbert W. Gray

United States Patent Office.

ADELBERT W. GRAY, OF BENNINGTON, OHIO.

Letters Patent No. 64,971, dated May 21, 1867.

IMPROVEMENT IN CHURNS.

The Schedule referred to in these Letters Patent and making part of the same.

TO ALL WHOM IT MAY CONCERN:

Be it known that I, ADELBERT W. GRAY, of Bennington, in the county of Morrow, and State of Ohio, have invented certain new and useful Improvements in Churns; and I do hereby declare that the following is a full and complete description of the same, reference being had to the accompanying drawings, making a part of this specification, in which—

Figure 1 is a side view of the churn.
Figure 2, a top view of the break and beater.
Like letters of reference refer to like parts in the several views.

In fig. 1, A is the body of the churn, which is a square metallic case, placed upon the platform B. Said platform is provided with a raised rim, which surrounds the bottom of the case, as indicated by the dotted lines a. By this rim the churn is held from displacement while being in use. In the bottom of the churn is arranged a break, C, as shown in fig. 2. The arms of this break are deeply cleft, and it will be seen that one of the fingers is thinner than the other, so that, when the break lies upon the bottom of the case, one finger of each arm only touches, whereas the other is above the bottom a short distance, as shown in fig. 1, in which J is the raised finger of the break, and E the one resting upon the bottom of the churn. Each alternate finger of each arm is thus arranged, i. e., one raised above the bottom and the other resting upon it. F is a shaft, the lower end of which stands upon a point and step, and on which it turns, the upper end being supported by the projecting arm G. To the lower end of this shaft is secured the beater H, fig. 2, a side view of the same being shown in fig. 1, in which it will be seen that the upper arms of the beater are made to bias from each opposite side, thus giving the same inclination of the bias to each arm as it revolves, whereas the bias of the lower arms is from the same edge downwards; and thus the inclination of the bias of the arms, as they revolve, is reversed, the one throwing the agitated cream upward and the other downward, while the upper arms of the beater throw the cream upward. As the beater is made to revolve the cream is thrown down upon the break, and driven under the raised finger alluded to. By this means it is completely agitated and broken, speedily disrupting the butter globules or sacs, and thus bringing the butter in a very short while, therefore making the labor of churning easily and quickly accomplished. The shaft and beaters are made to revolve by a band I, passing from the wheel J around the pulley K, and which is operated by the crank L. M is a guide or tension-roller, and is regulated by the screw and thumb-nut N.

The advantage of this churn is the rapid and thorough manner of agitating the cream, by driving it down upon and under the fingers of the break, so that the globules or sacs are quickly and completely broken, and thus bringing the butter in a very short time.

What I claim as my improvement, and desire to secure by Letters Patent, is—

The special arrangement of the break C, in combination with the beater H, when operated conjointly, in the manner and for the purpose set forth, by means of the band I, pulley K, and wheel J.

ADELBERT W. GRAY.

Witnesses:
GEO. HOWELL,
PHEBE C. HOWELL.